Patented Nov. 11, 1941

2,262,422

UNITED STATES PATENT OFFICE 2,262,422

PROTEIN PLASTIC MOLDING COMPOUND AND METHOD OF PREPARING THE SAME

George H. Brother, Urbana, and Leonard L. McKinney, Champaign, Ill., assignors to Henry A. Wallace, as Secretary of Agriculture of the United States of America No Drawing. Application July 8, 1938, Serial No. 218,120

2 Claims. (Cl. 260—7)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

One object of our invention is the production of a new and superior protein plastic molding material consisting essentially of thermoplastic hardened protein material and a compatible resin.

Another object of our invention is the production of a new and superior low priced molding material consisting principally of thermoplastic hardened fat-free soybean meal mixed with a compatible resinous material.

These objects are attained by first preparing the thermoplastic hardened protein material. Essentially this consists in treating the protein or protein material for 12–16 hours at room temperature with an aldehyde, such as formaldehyde, in water solution adjusted to a pH within the isoelectric range of the protein; or the protein material may be mixed dry with a slight excess of formaldehyde adjusted to the proper pH. The residue from the extraction of protein with aldehyde, especially formaldehyde, solutions, may also be used. This material in the case of a seed meal, such as fat-free soybean meal, would contain 30 to 40 percent formaldehyde hardened protein and, as a by-product from the protein extraction process, would be very inexpensive. The protein material is dried at 50° C. (77° F.) to a moisture content of not over 5 percent. The dried hardened protein material, which has been shown to be thermoplastic, is then mixed with the resin or resinous material, such as a phenolic- or a urea-formaldehyde resin or a resinous molding compound, or with a polyhydric alcohol-polycarboxylic acid resin, by any suitable means, such as grinding together in a ball mill, or in the case of the phenolics, compounding on calendar rolls. The resins specified above are preferred, but we do not wish to limit our invention to them. They may be used in any proportion with the thermoplastic hardened protein material, but for the specific purposes of this invention, the resin or resinous material should not exceed 49 percent of the mixture. The molding operation is performed with the mixture of the thermoplastic hardened protein material and the resin or resinous material by methods well known to those skilled in the art. If the resin used is a phenolic- or a urea-formaldehyde, the mixture will be found to have thermosetting properties and can be removed from the hot die without chilling under pressure.

It has long been known to those skilled in the art that protein plastic material possesses good strength and toughness. In order to impart these desirable qualities to resinous materials, numerous mixtures have been proposed in which non-hardened protein material has been added to modify the character of the resinous material. As examples we cite the following:

*Casein and phenol-formaldehyde*

| | | | |
|---|---|---|---|
| U. S. Pat. | 840,931 | Jan. 8, 1907 | B. B. Goldsmith |
| Brit. Pat. | 14,098 | June 18, 1907 | B. B. Goldsmith |
| U. S. Pat. | 1,027,122 | | B. B. Goldsmith |
| Fr. Pat. | 436,720 | Apr. 3, 1912 | Albert and Berend |
| Ger. Pat. | 280,648 | Aug. 21, 1913 | H. Kühl |
| Brit. Pat. | 111,171 | Nov. 22, 1916 | C. Weygang |
| Jap. Pat. | 34,922 | Sept. 12, 1919 | T. Nakanishi |
| Brit. Pat. | 176,405 | 1920 | H. Frood |
| U. S. Pat. | 1,395,729 | Nov. 1, 1921 | H. Plauson |
| Jap. Pat. | 42,075 | Mar. 24, 1922 | Hotta and Nakajimi |
| Brit. Pat. | 262,635 | Dec. 23, 1926 | I. G. Farb. Akt. Ges. |
| Brit. Pat. | 272,947 | June 17, 1926 | Jaroslaw's E. G. Fab. |
| Fr. Pat. | 635,745 | June 10, 1927 | Jaroslaw's E. G. Fab. |
| Fr. Pat. | 652,615 | Apr. 12, 1928 | F. Pabst |
| Russ. appl. | 24,198 | Feb. 25, 1928 | K. I. Tarsov |
| Russ. appl. | 29,211 | June 22, 1928 | K. I. Tarsov |
| Fr. Pat. | 700,411 | Aug. 11, 1930 | I. G. Farb. Akt. Ges. |
| Fr. Pat. | 771,933 | Oct. 19, 1934 | H. W. Hutton |
| Fr. Pat. | 808,497 | Feb. 8, 1937 | R. Tripet |
| U. S. Pat. | 2,053,850 | Sept. 8, 1936 | O. Sturken |

*Other proteins with phenol-formaldehyde*

| | | | | |
|---|---|---|---|---|
| Leather scrap | Fr. Pat. | 734,335 | July 1, 1931 | R. Collet |
| Corn gluten | U. S. Pat. | 1,988,475 | Jan. 22, 1935 | H. Berlin |
| Zein | U. S. Pat. | 965,137 | July 19, 1910 | B. B. Goldsmith |
| Zein | U. S. Pat. | 2,047,961 | July 21, 1936 | D. W. Hansen |
| Soybean | U. S. Pat. | 2,006,736 | July 2, 1935 | L. J. Fuhrmann |
| Albumin | U. S. Pat. | 1,080,188 | Dec. 2, 1913 | F. G. Wiechmann |
| Albumin | U. S. Pat. | 1,076,417 | Oct. 21, 1913 | B. B. Goldsmith |
| Glue | U. S. Pat. | 952,724 | Mar. 22, 1910 | L. Berend |
| Glue | Fr. Pat. | 751,798 | Sept. 9, 1933 | Laurin and Bidot |
| Glue | U. S. Pat. | 1,969,932 | Aug. 14, 1934 | Laurin and Bidot |

*Casein and urea-formaldehyde*

| | | | |
|---|---|---|---|
| Fr. Pat. | 636,219 | June 18, 1927 | F. Schmidt |
| Ger. Pat. | 591,045 | Jan. 16, 1934 | F. Schmidt |
| Ger. Pat. | 597,349 | May 23, 1934 | F. Schmidt |
| Ger. Pat. | 559,105 | Sept. 21, 1928 | K. Ripper |
| U. S. Pat. | 1,952,941 | Mar. 27, 1934 | K. Ripper |
| Can. Pat. | 284,967 | Nov. 20, 1928 | Schussler et al. |
| Fr. Pat. | 670,000 | Feb. 21, 1929 | Bakelite Corp. |
| U. S. Pat. | 1,725,805 | Aug. 27, 1929 | M. Landecker |
| U. S. Pat. | 1,732,533 | Oct. 22, 1929 | L. V. Redman |
| Fr. Pat. | 788,407 | Oct. 10, 1935 | Granville and Davion |
| U. S. Pat. | 2,075,276 | Mar. 30, 1937 | Carleton Ellis |
| U. S. Pat. | 2,075,804 | Apr. 6, 1937 | Carleton Ellis |
| U. S. Pat. | 2,090,452 | Aug. 17, 1937 | M. Landecker |

In addition, there is a well known commercial process, described by Herbert Chase in British Plastics and Moulded Products Trader, April 1936, in which soybean meal is mixed with wood flour, phenol, formaldehyde, lime, etc., to produce a molding material. In this, as in all the other cases listed, the protein material is not hardened when introduced into the mixture and such hardening as may take place in the mixture is not controlled within the pH ranges where we have found the thermoplastic hardened protein material to be produced which we specify and which we have found to be much superior for plastic purposes.

Our invention differs from all these and others to be found in the literature in the fact that we have discovered a new protein plastic, modified by mixing resins or resinous materials with thermoplastic hardened protein material of reduced water content. In all previous work, the unhardened protein was added to modify the resinous molding material. In consequence, the amount of protein material was considerably less than what we specify and the resulting molding plastic was in every case primarily the resinous plastic, modified by the protein.

A resin, such as phenol-formaldehyde or urea-formaldehyde molding resin, hardened at pH 4.2±1, mixed with a hardened protein, such as thermoplastic formaldehyde hardened soybean alpha protein, in amounts from 25 to 50 percent, produces a protein molding plastic material which is translucent and which can readily be colored any shade of red, orange, yellow, green or brown. This material is very tough and strong and more water resistant than protein plastic material. In addition, it has thermosetting properties in that it can be removed from the hot die without first chilling under pressure. Such a material will find a wide use in the trade wherever it is desirable to combine beauty with strength and where absolute water resistance is not essential, such as in the manufacture of buttons, beads, combs, interior electrical insulation, etc.

A very inexpensive but good protein molding plastic material may be prepared from a mixture of 25 to 50 percent of a molding compound, such as the phenol-formaldehyde wood flour compound, with thermoplastic formaldehyde hardened fat-free soybean flour. This material is limited to opaque colors and it has a water absorption of about 20 percent, but it is strong and permanent and molds readily, setting up in the hot die. A small amount of an agent, such as aluminum stearate is recommended in this mixture to increase the water resistance. Such a material will find a wide use in the lower price field in which shellac and other similar molding materials have not been very satisfactory. It may even find some application in the building trade, replacing inferior materials used in wall boards, etc. The wood flour may be replaced with thermoplastic hardened soybean meal to advantage.

Having described our invention, we give the following specific examples in illustration of the same, but we do not wish to be limited to these proportions nor to the specific commercial products we mention. All proportions given are parts by weight. Water absorption was determined by the method of A. S. T. M. D-45-33, which consists in molding test discs 2 inches in diameter by ⅛ inch thick, heating these in an oven at 50° C. (122° F.) for 24 hours to condition, weighing, immersing in distilled water for 24 hours at room temperature, and reweighing, the conditioned weight being taken as the dry weight. All protein material had been hardened by treatment with an aldehyde within the proper pH range and dried to under 5 percent moisture content. All mixing of the thermoplastic hardened protein material with the resinous material was done by grinding together in a ball or pebble mill for 12 to 16 hours.

In order to illustrate our invention, the following specific examples are set forth:

*Example 1.*—75 parts thermoplastic formaldehyde-hardened soybean alpha protein mixed with 25 parts phenolic molding compound (Bakelite BM 120) and 1 part aluminum tristearate. Molded at 330° F. (165° C.) at a pressure of 2,000 to 4,000 pounds per square inch for 3 minutes in the heated die and removed without chilling the die. Water absorption, 11.5 percent.

*Example 2.*—50 parts thermoplastic formaldehyde-hardened soybean alpha protein mixed with 50 parts phenolic molding resin (Bakelite XM 9131). Molding conditions as in Example 1. Water absorption 4.7 percent.

*Example 3.*—70 parts thermoplastic formaldehyde-hardened soybean alpha protein mixed with 5 parts ethylene glycol, 1 part aluminum tristearate and 25 parts phenolic molding compound (Bakelite BM 120). Molding conditions as described in Example 1. Water absorption, 15.5 percent.

*Example 4.*—50 parts thermoplastic formaldehyde-hardened soybean alpha protein mixed with 50 parts urea-formaldehyde molding mixture (Plaskon Ivory 447). Molded at 280° F. (138° C.) at a pressure of 2,000 to 4,000 pounds per square inch for 3 minutes in the heated die and removed without chilling the die. Water absorption, 1.9 percent.

*Example 5.*—75 parts thermoplastic formaldehyde-hardened fat-free soybean meal mixed with 1 part aluminum tristearate and 25 parts phenolic molding compound (Bakelite BM 120). Molding conditions as described in Example 1. Water absorption, 21.5 percent.

*Example 6.*—20 parts thermoplastic formaldehyde-hardened soybean alpha protein mixed with 5 parts ethylene glycol and 75 parts phenolic molding compound (Bakelite BM 120). Molding conditions as described in Example 1. Water absorption, 0.7 percent.

*Example 7.*—20 parts thermoplastic formaldehyde-hardened soybean alpha protein mixed with 5 parts ethylene glycol and 75 parts urea-formaldehyde molding compound (Plaskon Ivory 447). Molding conditions as described in Example 4. Water absorption, 3.7 percent.

*Example 8.*—20 parts thermoplastic formaldehyde-hardened soybean alpha protein mixed with 5 parts ethylene glycol and 75 parts phenolic molding resin (Bakelite XM 9131). Molding conditions as described in Example 1. Water absorption, 3.2 percent.

*Example 9.*—40 parts thermoplastic formaldehyde hardened soybean alpha protein mixed with 10 parts ethylene glycol and 50 parts phenolic molding compound (Bakelite BM 120). Molded as described in Example 1. Water absorption, 17 percent.

*Example 10.*—40 parts thermoplastic formaldehyde-hardened acetic acid casein mixed with 3 parts ethylene glycol, 20 parts phenolic molding resin (Bakelite XM 9131) and 0.2 part aluminum tristearate. Molding conditions as described in Example 1. Water absorption, 19 percent.

*Example 11.*—50 parts commercial untreated zein mixed with 25 parts urea-formaldehyde molding compound (Plaskon Ivory 447). Molding conditions as described in Example 4. Water absorption, 7 percent.

In every case a strong tough plastic resulted that was permanent, i. e., it neither spontaneously fractured nor did it fracture or check on drying after the water absorption test.

Although we specifically wish to claim as our invention the discovery of a new and superior protein plastic molding compound, we wish to call attention to Examples 6, 7, and 8 in which the thermoplastic formaldehyde hardened protein is used to modify the properties of the molding resin. This is new to the art, as never before has thermoplastic hardened protein material been employed in this manner and the products have new and unusual features. In every case the strength of the plastic was improved, and in some cases the homogeneity and appearance as well. The water absorption was well within practical limits.

Having thus described our invention, what we claim for Letters Patent is:

1. An article of manufacture, a thermosetting water-resistant protein molding powder, comprising essentially 20 parts thermoplastic formaldehyde-hardened soybean alpha protein that has been mixed with substantially 5 parts of ethylene glycol and 75 parts of a B-stage phenol-formaldehyde resin.

2. An article of manufacture, a thermosetting water-resistant protein molding powder, comprising 20 parts thermoplastic formaldehyde-hardened at a pH of 4.1±0.1 soybean alpha protein that has been mixed with substantially 5 parts ethylene glycol and substantially 75 parts of a phenolic molding powder consisting of a mixture of a B-stage phenol-formaldehyde resin, wood flour, and a suitable accelerator.

GEORGE H. BROTHER.
LEONARD L. McKINNEY.